US012035067B2

(12) United States Patent
Chen

(10) Patent No.: US 12,035,067 B2
(45) Date of Patent: Jul. 9, 2024

(54) SYSTEMS AND METHODS FOR PRESENCE-AWARE REPOSITIONING AND REFRAMING IN VIDEO CONFERENCING

(71) Applicant: Rovi Guides, Inc., San Jose, CA (US)

(72) Inventor: Tao Chen, Palo Alto, CA (US)

(73) Assignee: Rovi Guides, Inc., San Jose, CA (US)

(*) Notice: Subject to any disclaimer, the term of this patent is extended or adjusted under 35 U.S.C. 154(b) by 126 days.

(21) Appl. No.: 17/828,223

(22) Filed: May 31, 2022

(65) Prior Publication Data

US 2023/0388444 A1    Nov. 30, 2023

(51) Int. Cl.
*H04N 5/262*     (2006.01)
*G06T 3/40*      (2006.01)
*G06T 7/70*      (2017.01)
*G06V 20/40*     (2022.01)

(52) U.S. Cl.
CPC ............. *H04N 5/2628* (2013.01); *G06T 3/40* (2013.01); *G06T 7/70* (2017.01); *G06V 20/41* (2022.01); *G06T 2207/10016* (2013.01); *G06T 2207/20132* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 5,986,703 A * | 11/1999 | O'Mahony | ............ | H04N 7/142 348/333.12 |
| 9,253,442 B1 * | 2/2016 | Pauli | .................... | H04N 13/106 |
| 2006/0215765 A1 * | 9/2006 | Hwang | ................ | H04N 19/162 375/E7.172 |
| 2012/0027085 A1 * | 2/2012 | Amon | .................... | H04N 7/147 375/E7.243 |
| 2015/0288926 A1 * | 10/2015 | Glass | ..................... | H04N 7/152 348/14.09 |
| 2016/0267631 A1 * | 9/2016 | Shen | ......................... | G06T 7/90 |
| 2020/0342652 A1 * | 10/2020 | Rowell | .................. | G06V 10/82 |
| 2022/0072433 A1 * | 3/2022 | Wang | ................ | H04N 21/4826 |
| 2023/0247069 A1 * | 8/2023 | Khire | ................... | H04N 19/124 348/14.08 |

* cited by examiner

*Primary Examiner* — Duc Nguyen
*Assistant Examiner* — Assad Mohammed
(74) *Attorney, Agent, or Firm* — Haley Guiliano LLP

(57) ABSTRACT

Systems and methods are described herein for automatically reframing a video for a conference participant. Video of the participant is captured, and a first position of the participant is detected. An offset for the first position of the participant is then calculated to determine a relative distance from the center of the video frame. The captured video is modified based on the offset and is then presented in the video conference.

21 Claims, 13 Drawing Sheets

800

802
Calculate a translation vector based on the distance between the center position of the participant and the center of the video 804
N = 0; P = set horizontal coordinates of pixels comprising the participant; $T_P$ = number of pixels comprising the participant 806
Apply the translation vector to pixel P[N]

808
N = $T_P$-1?

810
N = N+1

End

FIG. 8

SYSTEMS AND METHODS FOR PRESENCE-AWARE REPOSITIONING AND REFRAMING IN VIDEO CONFERENCING

BACKGROUND

This disclosure is directed to video conferencing. In particular, techniques are disclosed for repositioning and reframing participants in a video conference to keep the participants fully visible.

SUMMARY

Frame cropping has been observed in some video conferencing applications. Default center cropping can lead to missing part of a talking head, or missing participants in a room. The experience can be improved by either a preventive repositioning of a participant or signaling the offsets of detected faces and bodies.

Usually, when presented to participants in the video conference, the video frames for each participant are scaled proportionally and arranged to fit in a layout. Applications often show a limited number of pictures per page and enable multiple pages at a call. Some applications, e.g., Microsoft Teams™, have more intelligence and dynamics built in. For example, there is spatial scaling to fit the pictures in the layout, as well as cropping of one or more of the pictures to fit the desired number of pictures in the layout. However, such cropping generally preserves only the center portion of the original picture. Therefore, if the original picture is of a conference room in which multiple participants are located, some of the participants may be cropped out of the picture. In other cases, a single participant may not be centered within the picture. A center-based cropping of the picture would result in a portion of the participant's body being cropped out of the picture.

The experience can be improved in multiple ways, considering the trade-offs between the complexity of processing and potential change to the existing implementation at servers and clients. Depending on the design, the choices of multiplexing-based and mixing-based have distributed processing or loads on the servers and client devices. Each client device accommodates capturing, detecting, compositing (if needed), encoding, and decoding of received video. The server can be configured to simply multiplex streams, or apply mixed processes of decoding, compositing, encoding, etc.

When repositioning or signaling for reframing is enabled, the entirety of remote participants can be better preserved. A first approach repositions participants within captured video prior to transmission. Assuming default center cropping is possibly applied at the receiving endpoints, the result of face or body detection at the sending endpoint can be used to adjust the positioning of the participant. When enabled, the composition with a virtual or captured background will create a look where the participant is always positioned in the center (or its proximity) of the video. This may all be accomplished at the sender's endpoint. Therefore, this option does not require any change to the existing processes of decoding, assembling, etc., at the receiver or on the server. This also eliminates the need of additional signaling in the streams and provides a preventive means for an improved experience in video conferencing. This can be made optional so that a user can review the effect and enable or disable the feature in the application. Importantly, this solution does not rely on a moving camera. For instance, the webcams installed on laptops do not necessarily automatically follow and adjust to the action. This approach does not require any update to hardware.

A second approach is to transmit signals from the client device capturing images or video of a participant to receiving devices (and/or intermediary devices) for reframing of the participant within the captured video. For example, position information indicating an absolute position or relative position of the participant may be transmitted to facilitate reframing. When the detection is done at capturing, regardless of being blended with a background image or not, this position information (e.g., indicating something as simple as an offset) in the video frame can be readily included in the encoded stream. This eliminates the need for a receiver, or for a server that assembles and controls all the downstream video, to apply additional detection of the captured participant requiring centering. The signaling is feasible through different ways of carriage in encoded streams by inserting a supplemental enhancement information (SEI) message or versatile supplemental enhancement information (VSEI) message, repurposing some field in the video usability information (VUI), etc. For a closed-end ecosystem, there is flexibility in minimizing the overhead of such signaling. In some cases, more than one participant may be captured in a single video (e.g., a conference room). Each participant's position may be detected and signaled separately (e.g., by each participant's respective client device). When multiple position signals are discovered, the feed may be prioritized in terms of minimizing any cropping. For instance, a feed can be kept in its full original aspect ratio, or minimally cropped so that all participants can still be seen.

The position information, or offset, for one or more participants may show some variation over time. Temporal stability in the case of reframing or cropping can be ensured by monitoring or filtering impulse changes in the offsets, which may indicate a quick move and back. Frequent changes of the cropping back and forth can be distractive in the presentation. The reframing considers a combination of spatial and temporal thresholds that may trigger an adjustment to the reframing in the middle of a video call.

Systems and methods are described herein for automatically reframing a video conference participant. Video of the participant is captured, and a first position of the participant is detected (e.g., by the same client device that captured the video). For example, image recognition techniques, such as facial recognition, edge detection, or pattern matching, may be performed on one or more frames of the capture video. An offset for the first position of the participant is then calculated to determine a relative distance from the center of the video frame. For example, the detected position may correspond to the center of the area occupied by the participant. A distance from the detected position to the center of the video frame can then be determined by a simple subtraction of the detected position from the center. The detected position may alternatively describe a left-most position and a right-most position of the area occupied by the participant. A center point between the left-most and right-most positions can then be obtained and compared to the center of the video frame. Once the offset has been calculated, the captured video is modified based on the offset. For example, the captured video can be cropped to an area that is centered on the first position of the participant. Alternatively, the pixels of each video frame that correspond to the area occupied by the participant can be translated horizontally, vertically, or both, based on the offset to effectively reposition the participant in the center of the video frame. The modified video is then presented in the video conference. In an embodiment, the disclosed techniques are used to reframe the video such that the participant is in a desired portion of the video other than the center. For example, the video may be thought of as including six portions (e.g., equal or roughly equal in size), wherein it is divided according to the "rule of thirds." The rule of thirds involves dividing up an image or video using two horizontal lines (e.g., equally spaced relative to each other and relative to the sides of the image or video) and two vertical lines (e.g., equally spaced relative to each other and relative to the top and bottom of the image or video). These horizontal and vertical lines may be referred to as the "rule of thirds grid." In an embodiment, the participant may be placed on one or more of these lines for the rule of thirds grid (the lines themselves may not be visible). Such off-center positioning may be desirable in some circumstances because off-center compositions are sometimes considered aesthetically pleasing, particularly when objects of interest are positioned on one of the horizontal or vertical lines according to the rule of thirds.

In some cases, the video is modified at the sending device before transmission to a video conferencing server. The sending device encodes a media stream including the modified video and transmits the stream to the video conferencing server. In other embodiments, the video conferencing server modifies the video. In such embodiments, the sending device encodes a media stream including the captured video and the offset and transmits the stream to the video conferencing server. The video conferencing server retrieves the offset from the media stream and modifies the video based on the offset. For example, the video conferencing server may crop the video based on the offset. If a virtual background is used by the participant, the video conferencing server may also receive the virtual background image from the sending device. This allows the video conferencing server to translate the position of the participant as described above and recomposite the modified video with the virtual background. The video conferencing server reencodes the modified video in a second media stream, which may also include video from other participants, and transmits the second media stream to client devices associated with each participant in the video conference.

In some cases, multiple participants may be captured in the same video. For example, a single camera may be located in a conference room attended by two or more participants. An offset is calculated for each detected participant in the video. Modification of the video is then based on all the offsets. This ensures that all participants captured in the video remain visible in the modified video. In such an embodiment, the system may prioritize capturing all participants in a frame over centering any participant or group of participants. In an embodiment, a center of a group of participants ("group-center") may be identified. Note, it is possible that no participant is positioned at this group-center. In such an embodiment, a system may reframe the video based on this group-center. If desired, the device that captures the video may transmit a single offset corresponding to the group-center (enabling receiving devices to reframe or crop accordingly).

In addition to cropping, the captured video may be scaled to a different size for inclusion in a video conference layout when present to the participants of the video conference. In order to maintain proper cropping when modifying the video, the offsets must be scaled with the video. A first resolution of the video is determined, as well as a second resolution to which the video is to be scaled. The video and the offset are then both scaled accordingly.

The position of the participant may be continuously or periodically monitored and the offset recalculated. If the participant moves, a change in the offset may be detected. In response, the change in the offset is compared to a threshold. If the offset has changed by at least the threshold amount, modification of the video is altered. For example, if the participant moves a threshold distance (e.g., quantified in pixels or estimated physical distance) or percent to one side of the previously determined position, a new offset may be used to define a new area to which the video should be cropped. To illustrate, the threshold may be 5% (e.g., relative to the total width or height of the frame). If the user moves 2% in such a scenario, the system may not reframe the video. On the other hand, if the participant moves 6% to the right, the system may respond by reframing the video. If desired, the threshold may change depending on the axis of movement. For example, the system may require a first percent or number of pixels (e.g., 5%) horizontal movement before reframing and a second percent or number of pixels (e.g., 10%) vertical movement before reframing. In some embodiments, the change in the offset may need to be temporally stable before modification of the video is altered. For example, if the participant changes their posture or walks to pick up an object and then returns to the previously determined position (or to within a threshold thereof) then modification of the video may not be altered, as the change in offset was not temporally stable. Only if the participant stays in a new location for a threshold amount of time is modification of the video altered. To illustrate, a participant's new position may need to be stable for five seconds, 30 seconds, or one minute before reframing. Any desired value may be utilized for the threshold amount of time. In some instances, the participant may manually set the threshold time (e.g., via text entry or a slider).

BRIEF DESCRIPTION OF THE DRAWINGS

The above and other objects and advantages of the disclosure will be apparent upon consideration of the following detailed description, taken in conjunction with the accompanying drawings, in which:

FIG. 8 is a flowchart representing an illustrative process for translating the position of the participant, in accordance with some embodiments of the disclosure;

DETAILED DESCRIPTION

Figure 1:
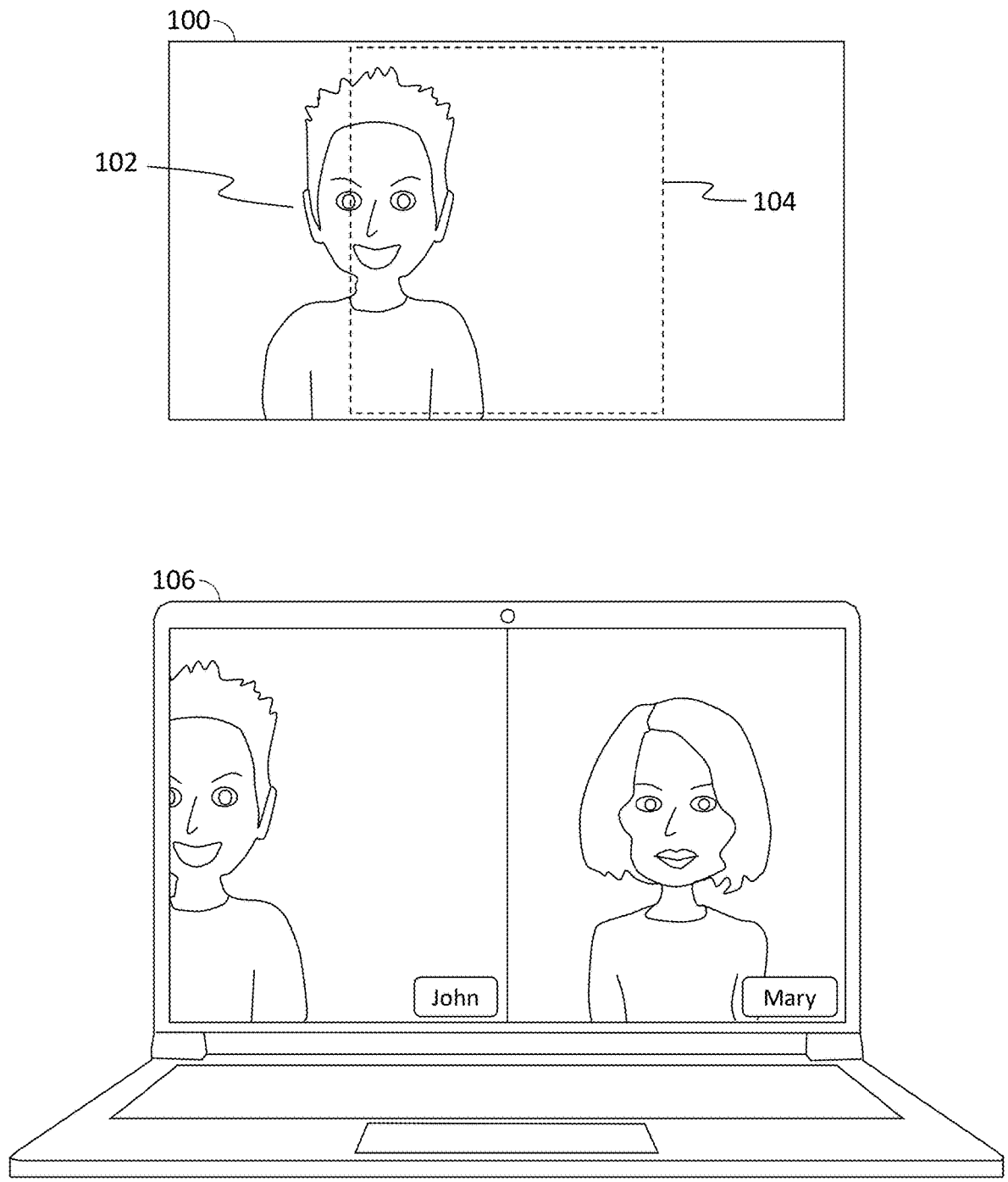
FIG. 1 shows an example of a modified video resulting from a standard center-cropped modification of a video.

FIG. 1 shows an example of a modified video resulting from a standard center-cropped modification of a video. Video 100 is captured by a client device. Participant 102 may not be centered within the captured video. A standard center-cropped modification of video 100 may crop video 100 to the area indicated by box 104. Thus, when displayed in a video conference layout on display 106, participant 102 is partly cropped out of the video.

Figure 2:
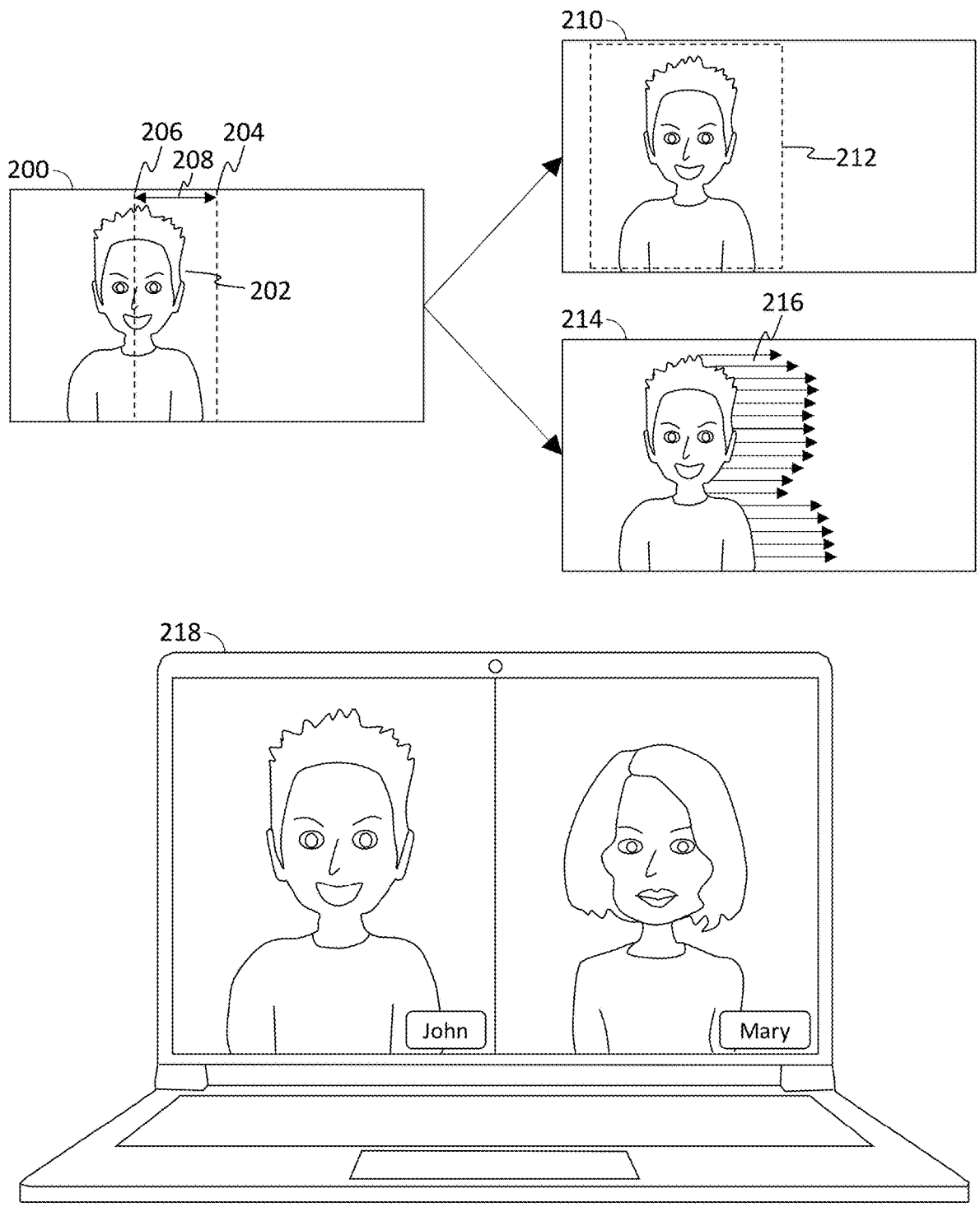
FIG. 2 shows an example of a modified video in accordance with some embodiments of the disclosure.

FIG. 2 shows an example of a modified video, in accordance with some embodiments of the disclosure. Video 200 is captured by a client device. Participant 202 may not be centered within the captured video. Center 204 of the video is identified. For example, a horizontal resolution parameter may be halved to determine the horizontal center point of video 200. Center 206 of the area of the video occupied by the participant can also be identified. For example, image recognition techniques such as edge detection, facial recognition, and pattern recognition may be used on one or more frames of the video to identify where in the video the participant is located. A left-most and right-most pixel of the identified area can be used to determine a horizontal coordinate representing the center of the identified area. A distance 208 between center 204 and center 206 can be determined by subtracting the horizontal coordinate of center 204 from that of center 206.

Using distance 208, the video can be modified. Modified video 210 can be generated by cropping the video to the area represented by box 212, which is offset from the center by distance 208. Modified video 214 can be generated by translating 216 each pixel by distance 208 to effectively reposition the participant to the center of the video frame. This translation may be accomplished by calculating a translation vector based on distance 208. The modified video can then be presented in a video conference layout as shown in display 218.

Figure 3:
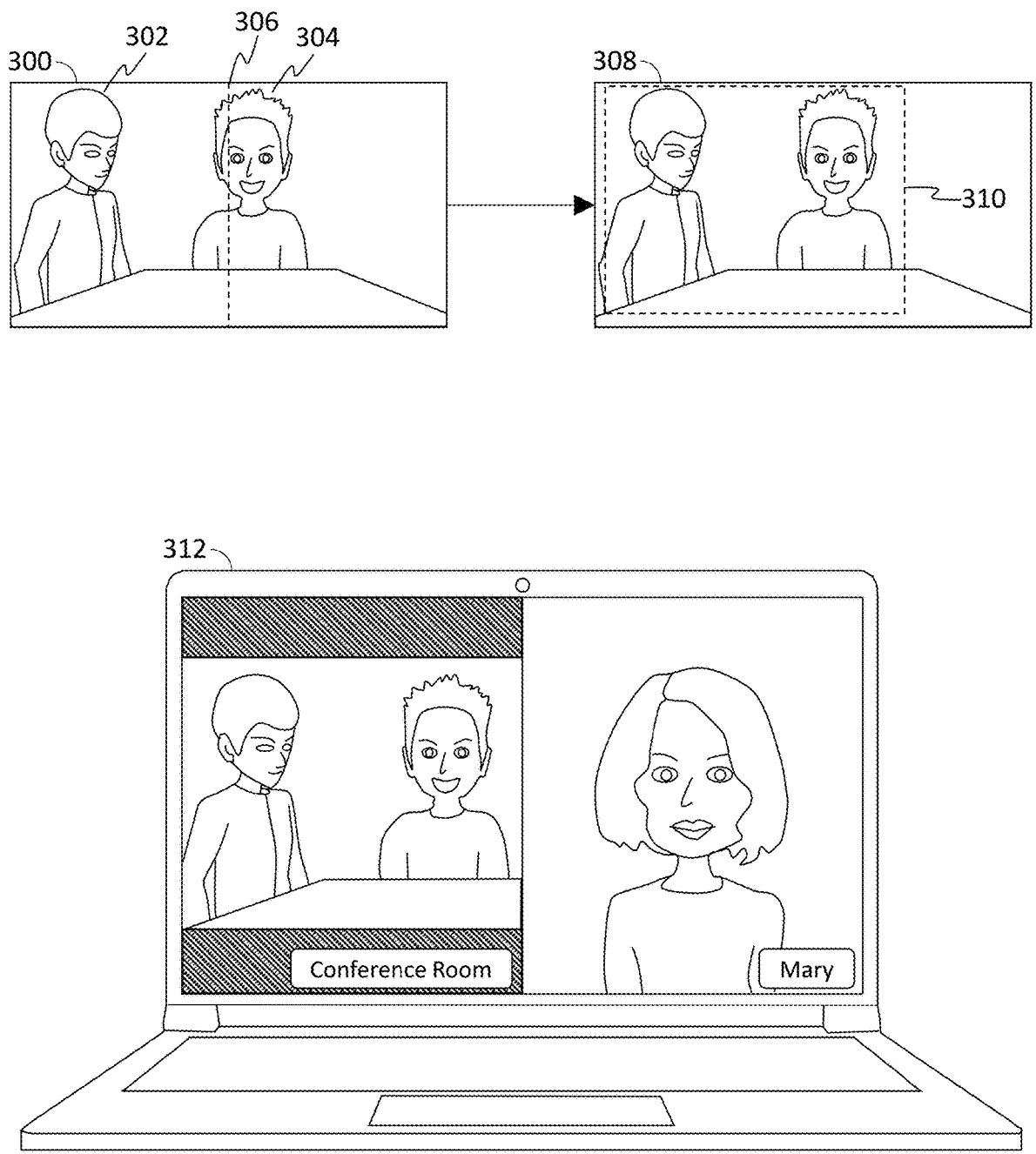
FIG. 3 shows an example of a modified video including multiple participants in accordance with some embodiments of the disclosure.

FIG. 3 shows an example of a modified video including multiple participants, in accordance with some embodiments of the disclosure. Video 300 is captured by a client device that is positioned in a room or other location at which two or more participants are physically located. In the example of FIG. 3, participants 302 and 304 are captured in video 300. A position for each participant is detected, and offsets for each are calculated. The modified video 308 may then be generated based on both offsets, with the video being cropped to the area represented by box 310. This area may be identified, for example, based on the left-most edge of participant 302 and the right-most edge of participant 304. The modified video is then presented in a video conference layout as shown in display 312. Modified video 308 may also be scaled to fit in the layout. If so, the offsets and cropped area are also scaled accordingly. In an embodiment, a group-center roughly halfway between the centers of the participants 302 and 304 is determined or calculated. In such an embodiment, a modified video similar to the video 308 may be generated based on this group-center. For example, a group-center offset may be calculated, which may then be utilized to modify the video to center the group of participants 302 and 304.

Figure 4:
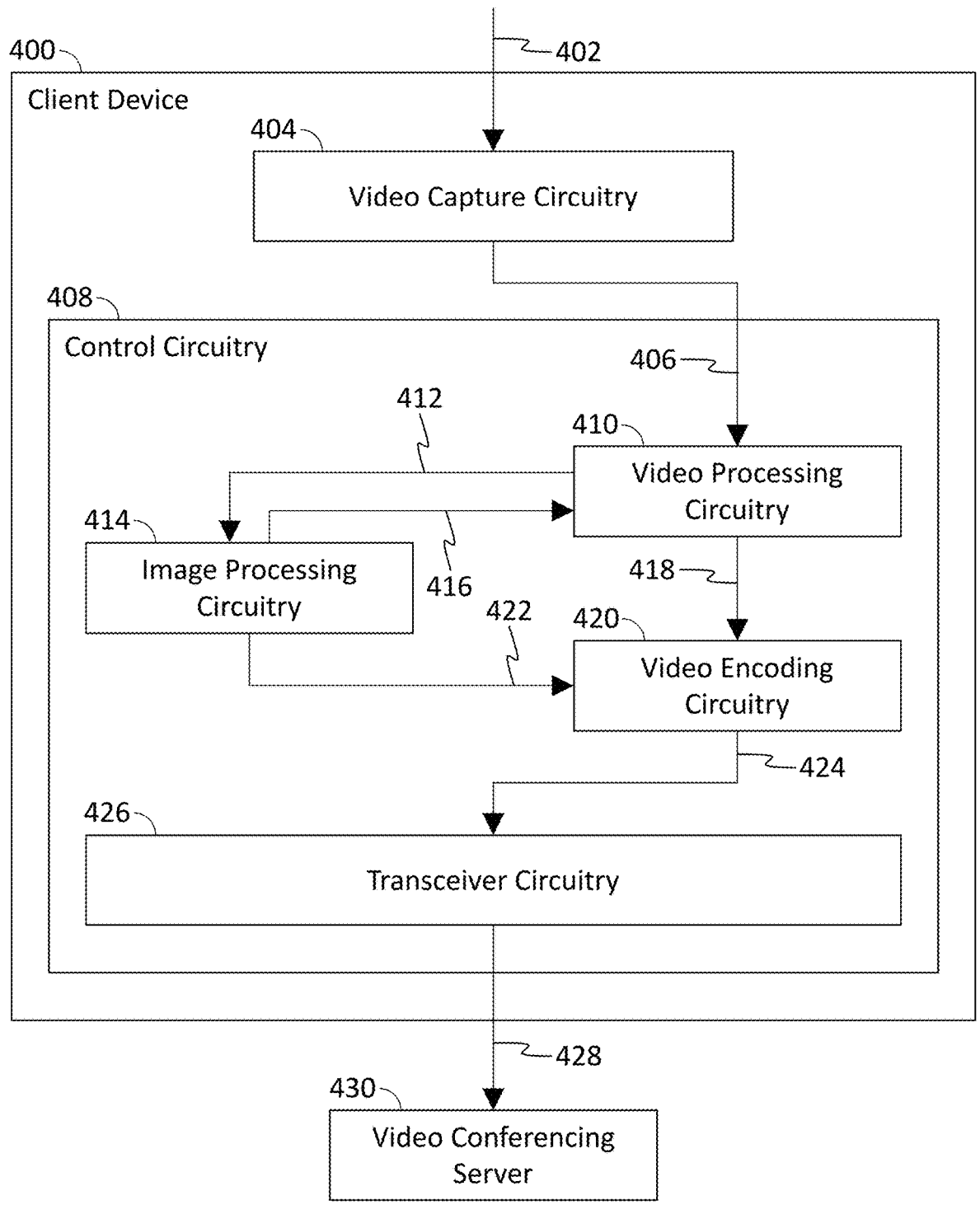
FIG. 4 is a block diagram showing components and data flow therebetween of a client device through which a participant participates in a video conference, in accordance with some embodiments of the disclosure.

FIG. 4 is a block diagram showing components and data flow therebetween of a client device through which a participant participates in a video conference, in accordance with some embodiments of the disclosure. Client device 400 may be a laptop, PC, smartphone, tablet, or any other device for connecting, and participating in, a video conference. Client device 400 receives 402 raw video of a participant. The raw video may be received from a camera or video capture device that is integrated with client device 400 or from an external device that is connected to client device 400 through either a wired or wireless connection. The raw video of the participant is received using video capture circuitry 404. Video capture circuitry 404 may perform an initial conversion of the raw video data into a format that can be processed by the client device. Video capture circuitry 404 then transmits 406 the video to control circuitry 408. Control circuitry 408 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 408 transmits the video at video processing circuitry 410. Video processing circuitry 410 determines how to modify the video to reframe the participant or participants captured in the video. Video processing circuitry 410 extracts one or more video frames from the video. For example, video processing circuitry 410 may extract a keyframe or an i-frame, or a number of successive keyframes or i-frames, from the video. Alternatively, video processing circuitry 410 may extract image data from one or more frames from which a complete image can be assembled. Video processing circuitry 410 transmits 412 the extracted frame or frames to image processing circuitry 414. Image processing circuitry 414 may use any suitable image recognition technique (e.g., facial recognition, edge detection, pattern matching, etc.) to determine where within the frame the participant or participants are located. For example, a single participant may be captured in the video. Image processing circuitry 414 may determine an array of pixels, or pixel coordinates, within the frame that comprise an image of the participant. Image processing circuitry 414 may transmit 416 the array of pixels to video processing circuitry 410 to enable modification of the video. Alternatively, image processing circuitry 414 may determine a left-most boundary and right-most boundary of the area occupied by the array of pixels. For example, image processing circuitry 414 may sort the array of pixels according to their horizonal coordinates. If the origin point (i.e., coordinate [0,0]) is located at the top-left corner of the frame, the pixel of the array of pixels having the lowest value horizonal coordinate can be used to identify the left-most boundary. Similarly, the pixel having the highest value horizontal coordinate can be used to identify the right-most boundary. Image processing circuitry 414 may transmit 416 the boundary information to video processing circuitry 410.

In other embodiments, image processing circuitry 414 further calculates a center of the area occupied by the array of pixels. For example, image processing circuitry may subtract the horizontal coordinate value of the left-most boundary from the horizontal coordinate value of the right-most boundary to obtain a width of the area. Image processing circuitry 414 may then divide the width by two to obtain a distance, in pixels, from either boundary to the center of the area and add the distance to the left-most boundary horizonal coordinate. This results in an absolute horizontal pixel coordinate representing the center of the area occupied by the array of pixels. Image processing circuitry 414 may then subtract the horizontal pixel coordinate value of the center of the area from the horizontal pixel coordinate value of the center of the frame (calculated by dividing the horizontal resolution of the frame by two). The resulting value gives the distance, in pixels, between the center of the frame and the center of the area occupied by the array of pixels, also referred to herein as an offset. Interpretation of the offset value differs based on the specification of the type of video. In one example, the top-left corner of the video frame is given the (x,y) coordinates of (0,0). In this example, coordinates on the left side of a frame will have lower values than coordinates on the right side of the frame, and coordinates on the top of the frame will have lower values than coordinates on the bottom of the frame. Thus, in this example, if the offset is positive, the participant is located to the left of the center of the frame. If the offset is negative, the participant is located to the right of the center of the frame. Image processing circuitry 414 may then transmit 416 the offset to video processing circuitry 410. Other coordinate systems may be used and will result in different offset interpretations. For example, the center point of the frame may be given the (x,y) coordinates of (0,0). The signed value of any x- or y-coordinate would therefore correspond directly to an offset from the center of the frame.

In some embodiments, any of the calculations discussed above in connection with image processing circuitry 414 may be performed by video processing circuitry 410. Image processing circuitry 414 may only make a determination as to whether a participant is captured in the video and transmit 416 minimal information related to the position of the participant. Video processing circuitry 410 may then perform the necessary calculations and/or operations to enable reframing or repositioning of the participant in the video.

Video processing circuitry 410, using the position information of the participant, modifies the video to center the participant in the video frame. Video processing circuitry 410 may crop the video based on the boundaries of the area occupied by the array of pixels or boundary information received from image processing circuitry 414. To accomplish this, video processing circuitry 410 may change the resolution of the video by removing pixels from at least one dimension (e.g., the horizontal dimension) of each frame of the video. For example, if the participant is positioned one hundred pixels to the left of the center of the video frame, video processing circuitry 410 may remove two hundred pixels from the right side of each frame of the video. This results in the horizontal resolution of the video frame being reduced by two hundred pixels and the center of the video frame being shifted one hundred pixels to the left.

If a virtual background is being used by the participant, it may also be possible to reposition the participant with the frame. Video processing circuitry 410 may generate a composite video by combining the video with a background image using known techniques. Prior to compositing, video processing circuitry 410 may calculate a translation vector. The translation vector may be based on the offset between the center of the area occupied by the array of pixels and the center of the video frame. For example, if the center of the area is located one hundred pixels to the left of the center of the video frame, the translation vector may be calculated to move each pixel one hundred pixels to the right. In some embodiments, such as where the participant is using a green screen or other backdrop to facilitate use of the virtual background, all pixels of the video frame may be moved using the translation vector.

As each video frame is modified, video processing circuitry 410 transmits 418 the modified video frames to video encoding circuitry 420. Video encoding circuitry 420 encodes the video frames into a streaming media format for use in video conferencing, such as Web Real-Time communication (WebRTC), Real Time Streaming Protocol (RTSP), or Real-Time Transport Protocol (RTP).

In some embodiments, modification of the video is not performed by the client device. Instead, image processing circuitry 414 transmits 422 the array of pixels, the offset, or other distance and/or positioning data described above to video encoding circuitry 420. Video encoding circuitry 420 may include any of these data in one or more video frames. For example, video encoding circuitry 420 may include, in an SEI message in the header of a video frame, one or more offsets describing where to crop the video frame in order to center the participant in the video frame.

Video encoding circuitry 422 transmits 424 the encoded video stream to transceiver circuitry 426. Transceiver circuitry 426 comprises a network connection over which data can be transmitted to and received from remote devices, such as an ethernet connection, WiFi connection, mobile broadband interface, or connection employing any other suitable networking protocol. Transceiver circuitry 426 in turn transmits 428 the encoded video stream to video conferencing server 430. Video conferencing server 430 combines the encoded video stream with other video streams received from other client devices into a single video stream for distribution to each client device. In some embodiments, video conferencing server 430 performs the video modifications described above, rather than client device 400.

Figure 5:
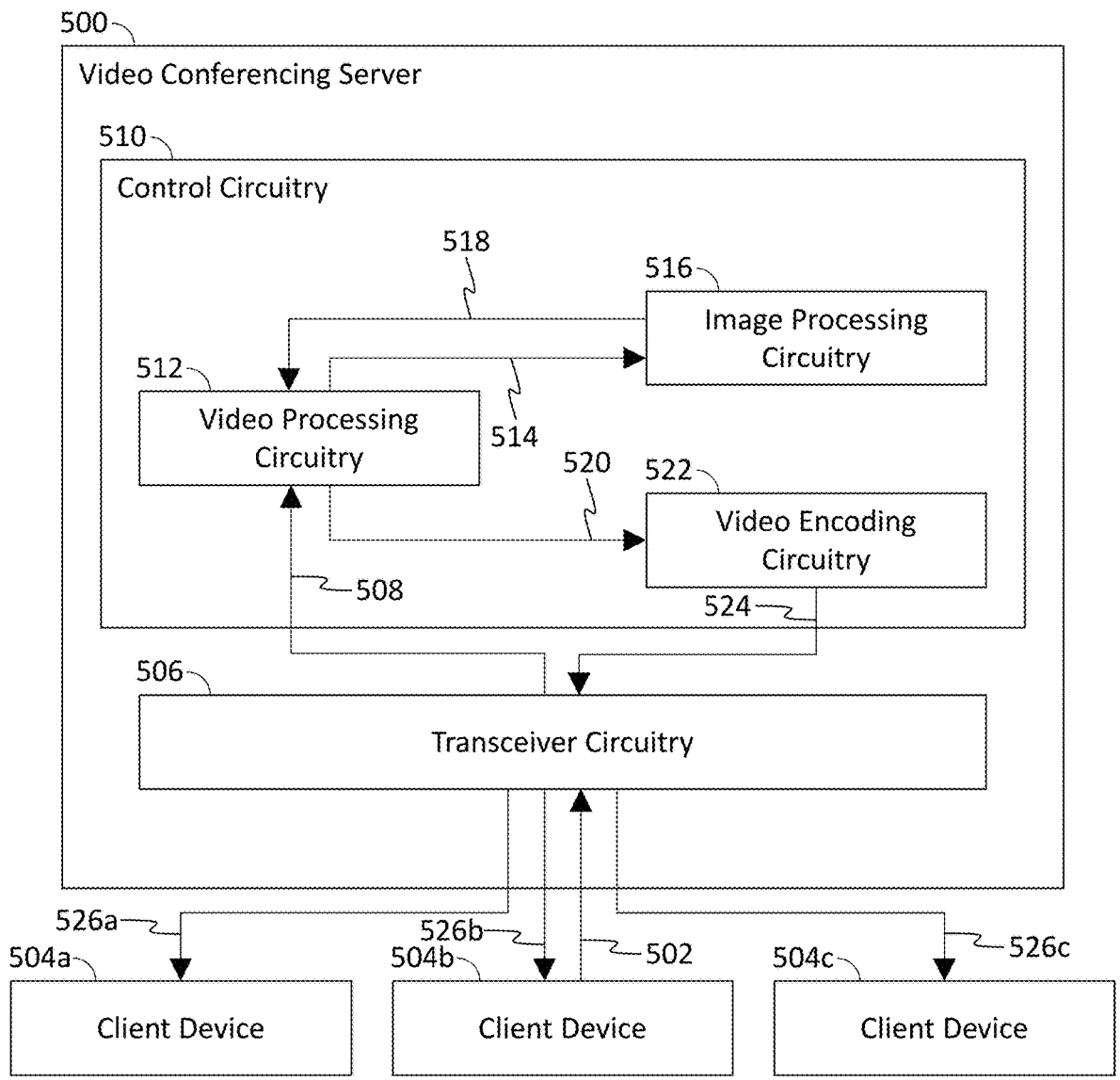
FIG. 5 is a block diagram showing components and data flow therebetween of a video conferencing server, in accordance with some embodiments of the disclosure.

FIG. 5 is a block diagram showing components and data flow therebetween of a video conferencing server, in accordance with some embodiments of the disclosure. Video conferencing server 500 receives 502 a video stream from a client device, such as client device 504*b*. Video conferencing server 500 may be similar to video conferencing server 430. Client device 504*b* may be similar to client device 400. Video conferencing server 500 receives the video stream using transceiver circuitry 506. Like transceiver circuitry 426, transceiver circuitry 506 comprises a network connection over which data can be transmitted to and received from remote devices, such as an ethernet connection, WiFi connection, mobile broadband interface, or connection employing any other suitable networking protocol. Transceiver circuitry 506 in turn transmits 508 the video stream to control circuitry 510, where it is received using video processing circuitry 512. Like control circuitry 408, control circuitry 510 may be based on any suitable processing circuitry and comprises control circuits and memory circuits, which may be disposed on a single integrated circuit or may be discrete components.

Video processing circuitry 512 retrieves, from the video stream, offset information encoded into the video stream by client device 504b. Using the offset information, video processing circuitry 512 modifies the video using methods described above in connection with FIG. 4. In some embodiments, the video stream does not include any offset information or other data that can be used to reframe the participant. In such embodiments, video conferencing server 500 performs the necessary calculations and determinations described above in connection with FIG. 4 and modifies the video on that basis. For example, video processing circuitry 512 extracts at least one frame of video from the video stream and transmits 514 the frame to image processing circuitry 516. Image processing circuitry 516 may perform the same functions as those described above in connection with image processing circuitry 414. Image processing circuitry 516 transmits 518 its results (e.g., an array of pixels, an array of pixel coordinates, boundaries, etc.) to video processing circuitry 512. Video processing circuitry 512 then modifies the video based on the data received from image processing circuitry 516.

As each video frame is modified, video processing circuitry 512 transmits 520 the modified video frames to video encoding circuitry 522. Video encoding circuitry 522 combines the modified video with video from each other client device to generate a single stream of all participants. Video encoding circuitry 522 may scale each video to fit in a video conferencing layout. Video encoding circuitry 522 encodes the combined video frames into a streaming media format for use in video conferencing, such as Web Real-Time communication (WebRTC), Real Time Streaming Protocol (RTSP), or Real-Time Transport Protocol (RTP). The encoded media stream is then transmitted 524 to transceiver circuitry 506, which in turn transmits the media stream to client devices 504a, 504b, and 504c participating in the video conference.

In some embodiments, video conferencing server 500 may have access to, or may receive from client device 504b, a virtual background image for compositing with the video received from client device 504b. In such cases, video processing circuitry 512 may generate a composite video by combining the video with a background image using known techniques. Prior to compositing, video processing circuitry 512 may calculate a translation vector. The translation vector may be based on the offset between the center of the area occupied by the array of pixels and the center of the video frame. For example, if the center of the area is located one hundred pixels to the left of the center of the video frame, the translation vector may be calculated to move each pixel one hundred pixels to the right. In some embodiments, such as where the participant is using a green screen or other backdrop to facilitate use of the virtual background, all pixels of the video frame may be moved using the translation vector.

Figure 6:
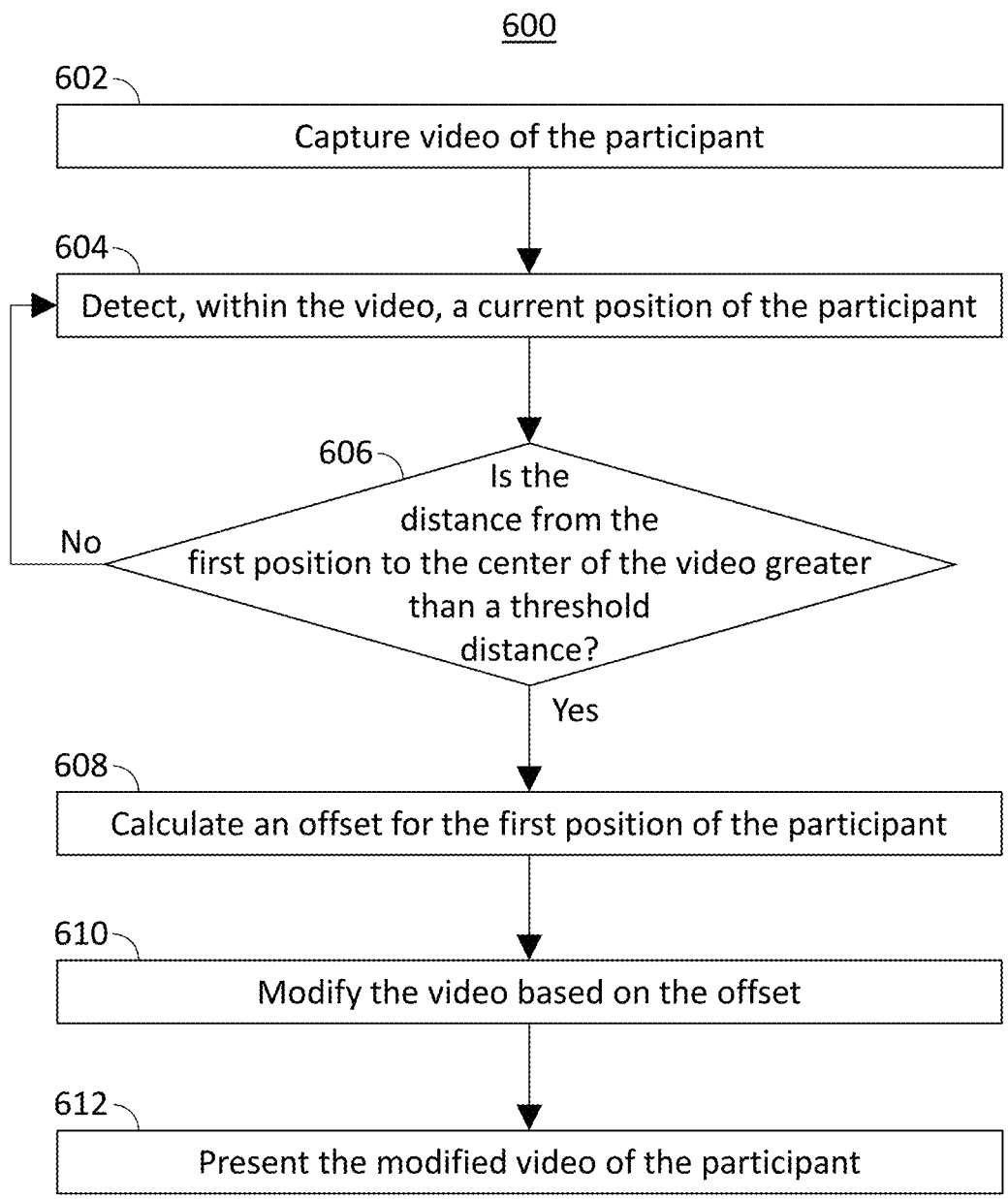
FIG. 6 is a flowchart representing an illustrative process for reframing a participant in a video, in accordance with some embodiments of the disclosure.

FIG. 6 is a flowchart representing an illustrative process 600 for reframing a participant in a video, in accordance with some embodiments of the disclosure. Process 600 may be implemented on control circuitry 408 or control circuitry 510. In addition, one or more actions of process 600 may be incorporated into or combined with one or more actions of any other process or embodiment described herein.

At 602, the control circuitry captures video of the participant. For example, a camera or other imaging sensor or device is used to capture raw video of the participant. At 604, the control circuitry detects, within the video, a current position of the participant. This may be accomplished using methods described above in connection with FIG. 4. For example, the control circuitry may extract a frame of video and use image recognition techniques to identify an area of the frame occupied by the participant, or an array of pixels comprising an image of the participant.

At 606, the control circuitry determines whether the distance from the current position of the participant to the center of the video is greater than a threshold distance. The control circuitry, using the current position information, calculates a center of the area occupied by the participant. This may be accomplished using methods described above in connection with FIG. 4. This calculated center position is compared with the center of the video frame, and the difference between them compared with a threshold distance value. If the distance from a first position (e.g., the current position) of the participant to the center of the video does not exceed the threshold distance ("No" at 606), then processing returns to 604, where control circuitry continues to monitor the position of the participant within the video frame.

If the distance between the current position of the participant and the center of the video frame is greater than the threshold distance ("Yes" at 606), then, at 608, the control circuitry calculates an offset for the current position of the participant. This may be accomplished using methods described below in connection with FIG. 7. At 610, the control circuitry modifies the video based on the offset. For example, the control circuitry may crop the video to a smaller area, wherein the area removed from the video corresponds to, or is calculated from, the offset. A video having a horizontal resolution of one thousand pixels in which the participant has an offset of one hundred pixels can be cropped to a horizontal resolution of eight hundred pixels in order to place the participant in the center of the video. This removes an area from the video whose width is twice the offset, i.e., two hundred pixels. As another example, the control circuitry may translate each pixel in an array of pixels representing an image of the participant according to a translation vector that is based on the offset. The magnitude of the translation vector corresponds to the absolute value of the offset, and the direction of the translation vector corresponds to the sign of the value of the offset. A positive offset value, indicating that the current position of the participant is on the left side of the video, results a rightward translation vector. Similarly, a negative offset value, indicating that the current position of the participant is on the right side of the video, results in a leftward translation vector.

At 612, the control circuitry presents the modified video of the participant. If the actions of FIG. 6 are performed on a client device by control circuitry 408, presentation of the modified video may comprise transmission of a video stream to a video conferencing server for distribution to each participant. If the actions of FIG. 6 are performed on a video conferencing server by control circuitry 510, presentation of the modified video may comprise generating a combined video stream of the modified video and other videos from other participants (some of which may also be modified) into a single stream for distribution to each participant.

The actions or descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
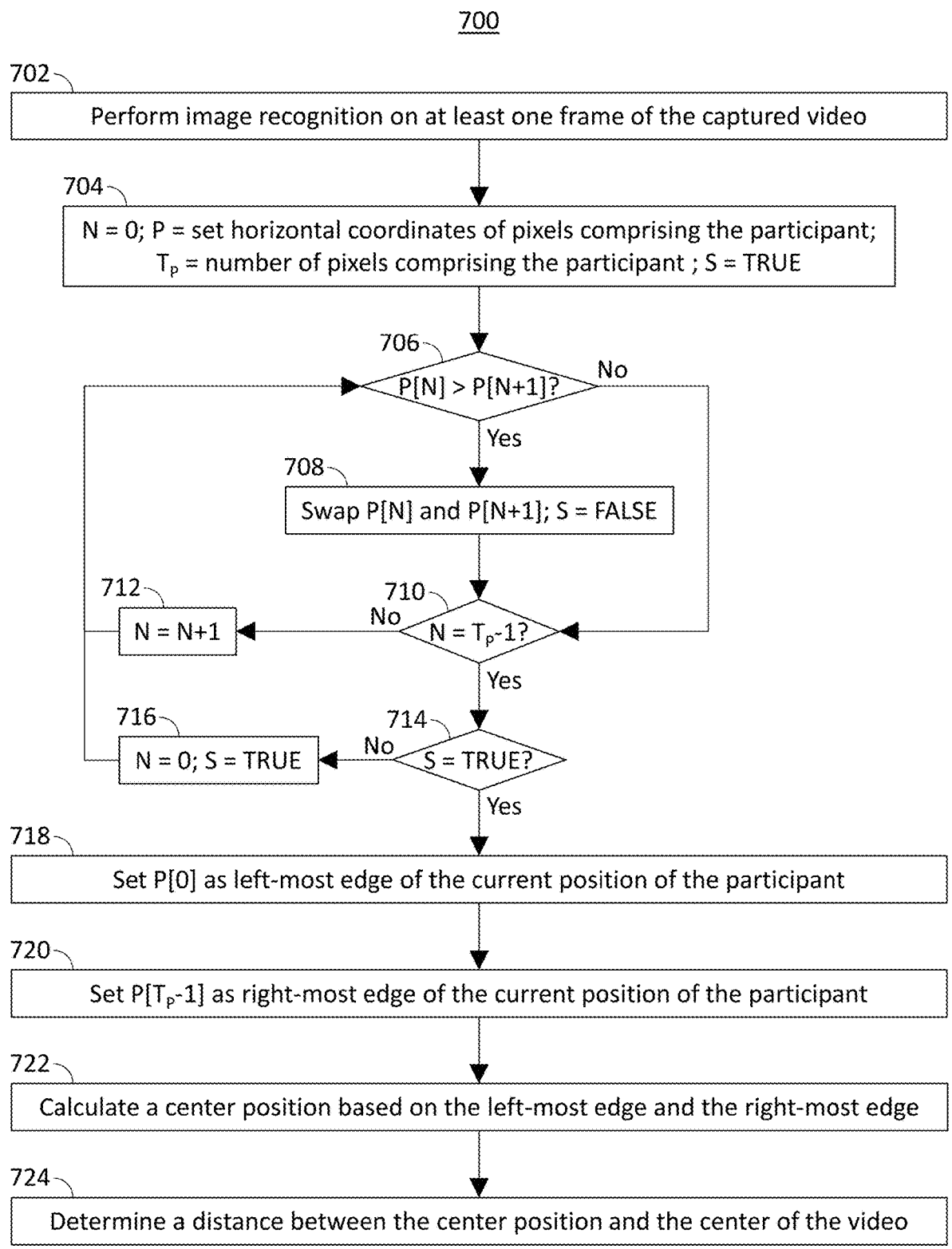
FIG. 7 is a flowchart representing an illustrative process for calculating an offset, in accordance with some embodiments of the disclosure.

FIG. 7 is a flowchart representing an illustrative process 700 for calculating an offset in accordance with some embodiments of the disclosure. Process 700 may be implemented on control circuitry 408 or control circuitry 510. In addition, one or more actions of process 700 may be incorporated into or combined with one or more actions of any other process or embodiment described herein.

At 702, the control circuitry performs image recognition on at least one frame of the captured video. The control circuitry may extract one or more frames from the captured video for image recognition. Multiple frames may be used for improved accuracy, or for tracking movement of the participant. At 704, the control circuitry initializes a number of variables. First, the control circuitry initializes a counter variable N, setting its value to zero. The control circuitry also initializes a variable P representing the set of horizontal coordinates of pixels comprising the participant, and a variable $T_P$ representing the total number of pixels comprising the participant (i.e., the number of pixels represented by set P). Finally, the control circuitry initializes a Boolean variable S to be used as a flag for whether a sorting process is complete, setting its value to TRUE.

The control circuitry sorts the pixels in set P based on their horizontal coordinates using any known sorting method. For illustrative purposes, the process shown in FIG. 7 (from 706 to 716) uses a bubble sort method, as will be described below. However, a person of ordinary skill in the art will appreciate that any other suitable sorting method or algorithm can be used without departing from the invention described herein.

At 706, the control circuitry compares the horizontal coordinate value of the $N^{th}$ element of the set P (P[N]) with the $N+1^{th}$ element of the set P (P[N+1]). If the value of P[N] is greater than that of P[N+1] ("Yes" at 706), then, at 708, the control circuitry swaps P[N] and P[N+1] and sets the value of S to FALSE. After swapping the two elements of set P, or if P[N] is not greater than P[N+1] ("No" at 706), at 710, the control circuitry determines whether N is equal to $T_P-1$. If N is not equal to $T_P-1$ ("No" at 710), then there are additional elements in set P to be processed. Thus, at 712, the control circuitry increments the value of N by one and processing returns to 706. If N is equal to $T_P-1$ ("Yes" at 710), then all elements of P have been processed and, at 714, the control circuitry determines whether S is set to TRUE. If S is not set to TRUE ("No" at 714), then the sort algorithm must be repeated to ensure that all elements have been properly sorted. Thus, at 716, the control circuitry resets the value of N to zero and resets S to TRUE. Processing then returns to 706.

If the sorting process is completed and S is still set to TRUE ("Yes" at 714), then the sorting process is complete and, at 718, the control circuitry sets P[0] as the left-most edge of the current position of the participant. At 720, the control circuitry similarly sets P[$T_P-1$] as the right-most edge of the current position of the participant. This is because, as a result of the sorting, the first element of P, P[0], has the lowest, or left-most, horizontal pixel coordinate and the last element of P, P[$T_P-1$], has the highest, or right-most, horizontal pixel coordinate. At 722, the control circuitry calculates a center position based on the left-most edge and the right-most edge. For example, subtracting the left-most horizontal coordinate P[0] from the right-most horizontal coordinate P[$T_P-1$] yields the number of pixels from the left-most edge to the right-most edge of the area occupied by the set of pixels P. Half of this number, added to the left-most pixel coordinate P[0], gives the horizontal pixel coordinate within the entire frame that represents the center position of the participant. At 724, the control circuitry calculates an offset by determining a distance between the center position and the center of the video. For example, the control circuitry may subtract the horizontal pixel coordinate of the center position from half of horizontal resolution of the video frame. This results in a number of pixels whose absolute value represents the distance between the center position and the center of the video frame, and whose sign corresponds to which side of the center of the video the center position is located.

The actions or descriptions of FIG. 7 may be used with any other embodiment of this disclosure. In addition, the actions and descriptions described in relation to FIG. 7 may be done in suitable alternative orders or in parallel to further the purposes of this disclosure.

FIG. 8 is a flowchart representing an illustrative process 800 for translating the position of the participant, in accordance with some embodiments of the disclosure. Process 800 may be implemented on control circuitry 408 or control circuitry 510. In addition, one or more actions of process 800 may be incorporated into or combined with one or more actions of any other process or embodiment described herein.

At 802, the control circuitry calculates a translation vector based on the distance between the center position of the participant and the center of the video. The magnitude of the vector corresponds to the absolute value of the distance, or offset, between the center position of the participant and the center of the video. The direction of the vector corresponds to the sign of the offset.

At 804, the control circuitry initializes a counter variable N, setting its value to zero, a variable P representing the set of horizontal coordinates of pixels comprising the participant, and a variable $T_P$ representing the total number of pixels that comprise the participant. At 806, the control circuitry applies the translation vector to the $N^{th}$ pixel P[N]. This relocates the $N^{th}$ pixel to a new position such that, when all pixels have been similarly relocated, the set of pixels comprising the participant with be centered on the center of the video. At 808, the control circuitry determines whether N is equal to $T_P-1$. If not ("No" at 808), then, at 810, the control circuitry increments the value of N by one and processing returns to 806. If N is equal to $T_P-1$ ("Yes" at 808), meaning that all pixels in P have been translated to a new position, then the process ends.

The actions or descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
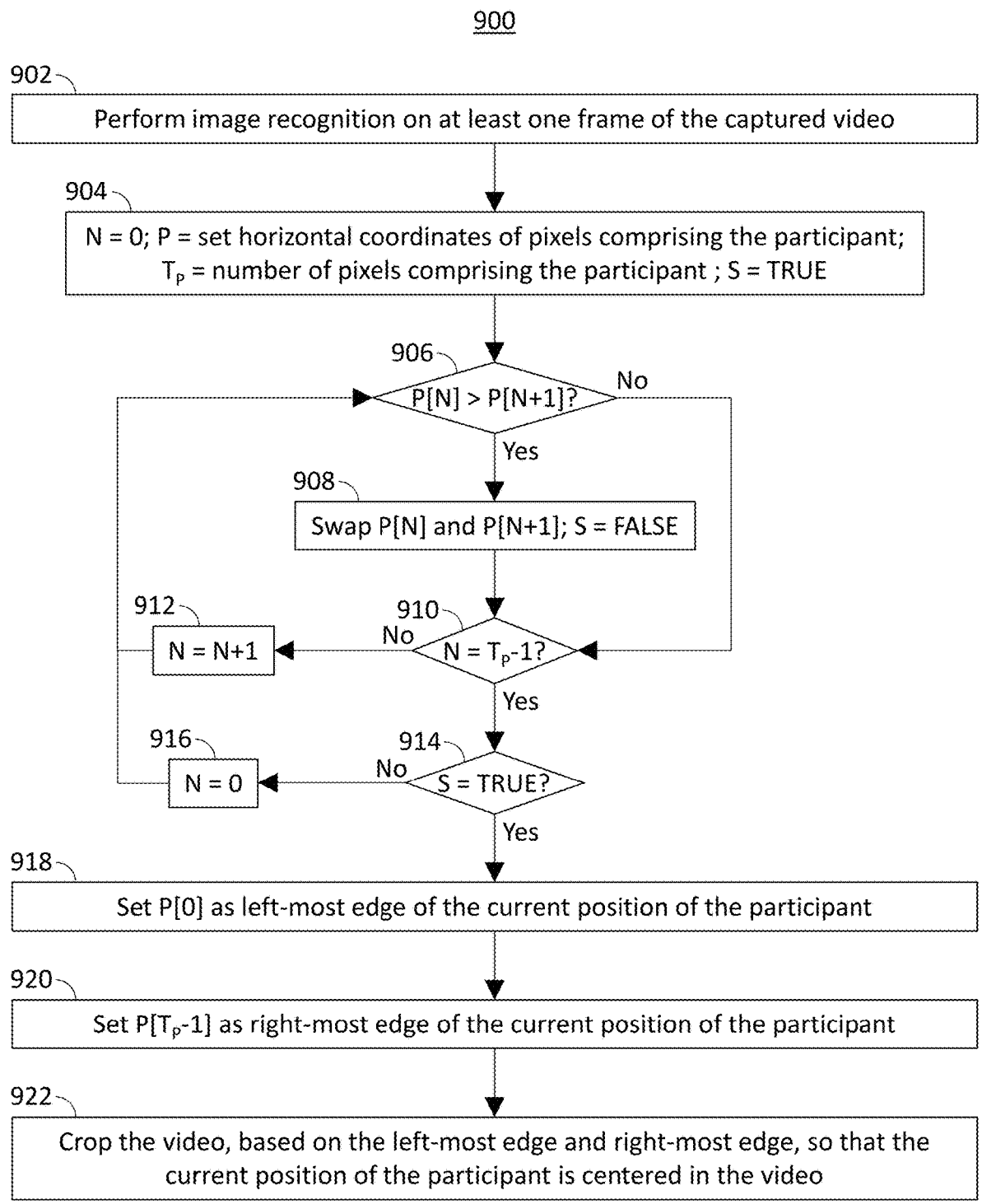
FIG. 9 is a flowchart representing an illustrative process for cropping a video based on the detected position of a participant, in accordance with some embodiments of the disclosure.

FIG. 9 is a flowchart representing an illustrative process 900 for cropping a video based on the detected position of a participant, in accordance with some embodiments of the disclosure. Process 900 may be implemented on control circuitry 408 or control circuitry 510. In addition, one or more actions of process 900 may be incorporated into or combined with one or more actions of any other process or embodiment described herein.

At 902, the control circuitry performs image recognition on at least one frame of the captured video. The control circuitry may extract one or more frames from the captured video for image recognition. Multiple frames may be used for improved accuracy, or for tracking movement of the participant. At 904, the control circuitry initializes a number of variables. First, the control circuitry initializes a counter variable N, setting its value to zero. The control circuitry also initializes a variable P representing the set of horizontal coordinates of pixels comprising the participant, and a variable $T_P$ representing the total number of pixels comprising the participant (i.e., the number of pixels represented by set P). Finally, the control circuitry initializes a Boolean variable S to be used as a flag for whether a sorting process is complete, setting its value to TRUE.

The control circuitry sorts the pixels in set P based on their horizontal coordinates using any known sorting method. For illustrative purposes, the process shown in FIG. 9 (from 906 to 916) uses a bubble sort method, as will be described below. However, a person of ordinary skill in the art will appreciate that any other suitable sorting method or algorithm can be used without departing from the invention described herein.

At 906, the control circuitry compares the horizontal coordinate value of the $N^{th}$ element of the set P (P[N]) with the $N+1^{th}$ element of the set P (P[N+1]). If the value of P[N] is greater than that of P[N+1] ("Yes" at 906), then, at 908, the control circuitry swaps P[N] and P[N+1] and sets the value of S to FALSE. After swapping the two elements of set P, or if P[N] is not greater than P[N+1] ("No" at 906), at 910, the control circuitry determines whether N is equal to $T_P-1$. If N is not equal to $T_P-1$ ("No" at 910), then there are additional elements in set P to be processed. Thus, at 912, the control circuitry increments the value of N by one and processing returns to 906. If N is equal to $T_P-1$ ("Yes" at 910), then all elements of P have been processed and, at 914, the control circuitry determines whether S is set to TRUE. If S is not set to TRUE ("No" at 914), then the sort algorithm must be repeated to ensure that all elements have been properly sorted. Thus, at 916, the control circuitry resets the value of N to zero and resets S to TRUE. Processing then returns to 906.

If the sorting process is completed and S is still set to TRUE ("Yes" at 914), then the sorting process is complete and, at 918, the control circuitry sets P[0] as the left-most edge of the current position of the participant. At 920, the control circuitry similarly sets $P[T_P-1]$ as the right-most edge of the current position of the participant. This is because, as a result of the sorting, the first element of P, P[0], has the lowest, or left-most, horizontal pixel coordinate and the last element of P, $P[T_P-1]$, has the highest, or right-most, horizontal pixel coordinate. At 922, the control circuitry crops the video based on the left-most edge and the right-most edge, so that the current position of the participant is centered in the video. For example, if the current position of the participant is on the left side of the video, control circuitry 408 may remove a portion of each frame of video from the right of the video frame until the right-most edge, or until the distance from the right-most edge to the right end of the video frame is equal to the distance from the left-most edge to the left end of the video frame. Alternatively, control circuitry 408 of a user device may encode the edges, or boundaries, in the video stream transmitted to video conferencing server 500, such as in an SEI message. Alternatively, as described below in connection with FIG. 10, control circuitry 510 may extract that information from the video stream and crop the video accordingly.

The actions or descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
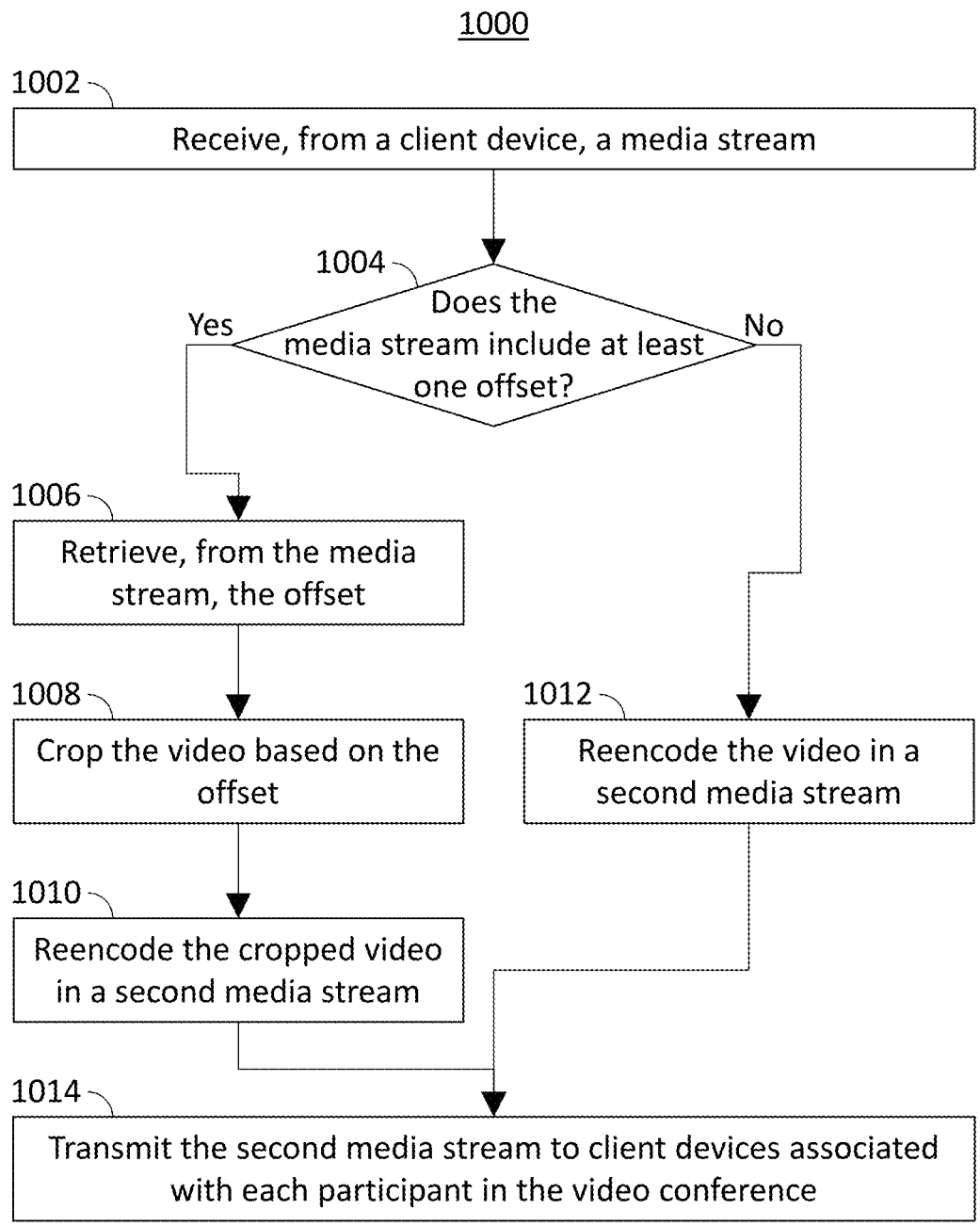
FIG. 10 is a flowchart representing an illustrative process for cropping a video at a video conferencing server, in accordance with some embodiments of the disclosure.

FIG. 10 is a flowchart representing an illustrative process 1000 for cropping a video at a video conferencing server, in accordance with some embodiments of the disclosure. Process 1000 may be implemented on control circuitry 510. In addition, one or more actions of process 1000 may be incorporated into or combined with one or more actions of any other process or embodiment described herein.

At 1002, control circuitry 510 receives, from a client device, a media stream. At 1004, control circuitry 510 determines whether the media stream includes at least one offset. For example, control circuitry 510 may examine metadata, packet headers, or other data encoded in the media stream to identify any offset parameters included by the client device. If at least one offset is detected ("Yes" at 1004), then, at 1006, control circuitry 510 retrieves the offset from the media stream and, at 1008, crops the video based on the offset. This may be accomplished using methods described above in connection with FIG. 9.

At 1010, control circuitry 510 reencodes the cropped video into a second media stream. Control circuitry 510 receives media streams from each participant in the video conference and distributes to each participant a single media stream containing the videos from every participant. Thus, control circuitry 510 combines the cropped video with other videos received from other participants into a single media stream and reencodes the video in a streaming format suitable for video conferencing, such as WebRTC, RTSP, RTP, or any other suitable format. If no offsets are included in the media stream ("No" at 1004), then, at 1012, control circuitry 510 simple reencodes the video from the media stream into the second media stream along with the videos from each other participant. At 1014, control circuitry 510 transmits the second media stream to the client devices associated with each participant in the video conference. For example, control circuitry 510 may use a multicast process in which the second media stream is directed to the IP addresses of each of the client devices.

The actions or descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
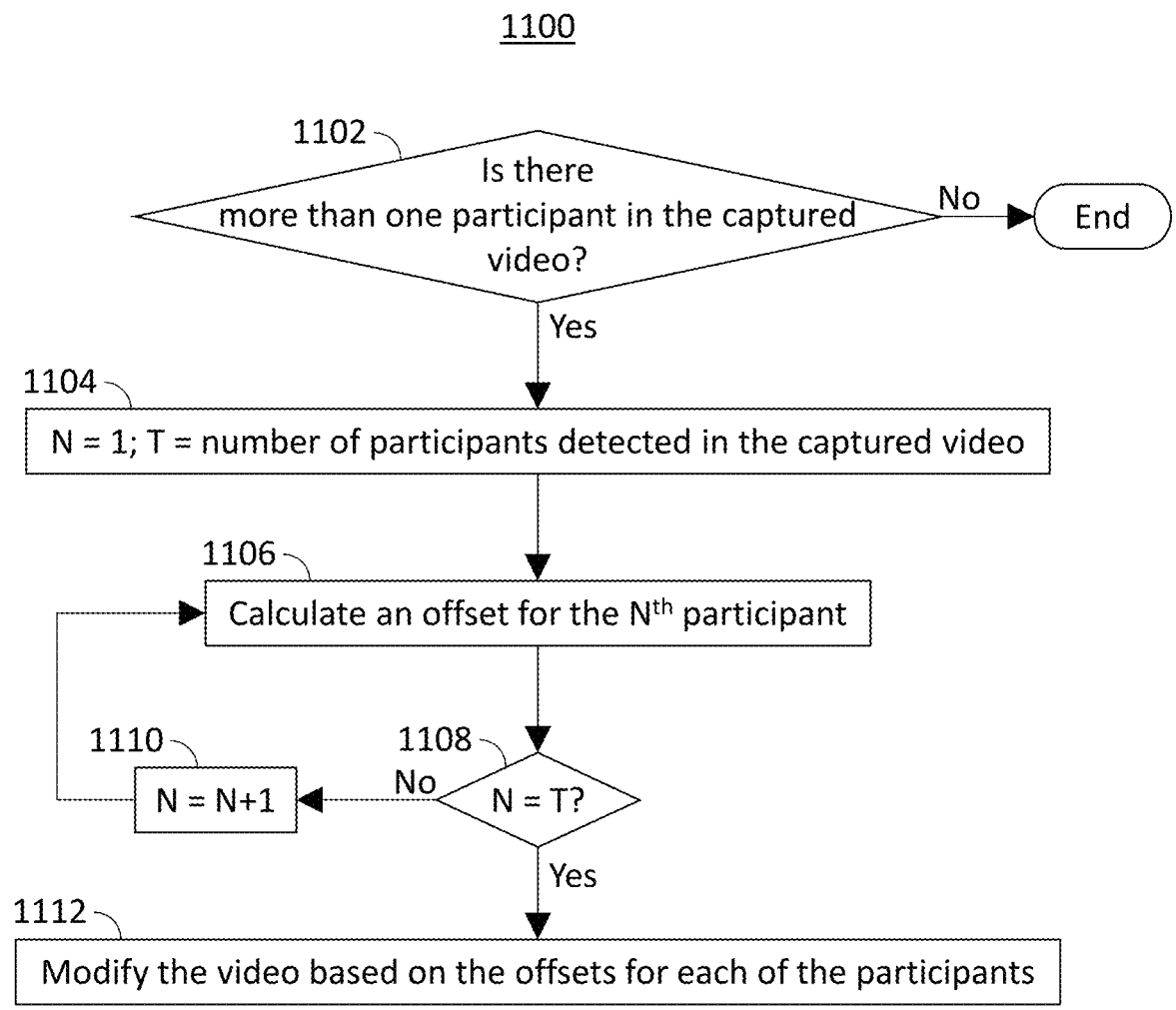
FIG. 11 is a flowchart representing an illustrative process for modifying a video including multiple participants, in accordance with some embodiments of the disclosure.

FIG. 11 is a flowchart representing an illustrative process 1100 for modifying a video including multiple participants, in accordance with some embodiments of the disclosure. Process 1100 may be implemented on control circuitry 408 or control circuitry 510. In addition, one or more actions of process 1100 may be incorporated into or combined with one or more actions of any other process or embodiment described herein.

At 1102, the control circuitry determines whether there is more than one participant in the captured video. For example, the control circuitry may use image processing techniques to identify participants in frames of the captured video. The control circuitry may use a counter variable to track the number of participants detected. Alternatively or additionally, when a set of pixels is returned as a result of image processing as described above in connection with FIG. 7, the control circuitry may determine that two or more groups of non-contiguous pixels are included in the set of pixels. The area occupied by each non-contiguous group may be compared to the area occupied by each other non-contiguous group, or to a threshold area, to determine the number of participants captured in the video.

If only one participant is present in the captured video ("No" at 1102), then the process ends. If more than one participant is present in the captured video ("Yes" at 1102), then, at 1104, the control circuitry initializes a counter variable N, setting its value to one, and a variable T representing the number of participants detected in the captured video. At 1106, the control circuitry calculates an offset for the $N^{th}$ participant. This may be accomplished using methods described above in connection with FIG. 7.

At 1108, the control circuitry determines whether N is equal to T, meaning that offsets have been calculated for all participants. If N is not equal to T ("No" at 1108), then, at 1110, the control circuitry increments the value of N by one, and processing returns to 1106. If N is equal to T ("Yes" at 1108), then, at 1112, the control circuitry modifies the video based on the offsets of each of the participants. For example, the control circuitry may determine the average of all the offsets and modify the video according to the average. Alternatively, the control circuitry may modify the video based on the right-most edge of the right-most participant and the left-most edge of the left-most participant. As another alternative, a translation vector may be calculated for each participant such that all participants are repositioned to be arrayed outward to either side from the center of the video frame.

The actions or descriptions of FIG. 11 may be used with any other embodiment of this disclosure. In addition, the actions and descriptions described in relation to FIG. 11 may be done in suitable alternative orders or in parallel to further the purposes of this disclosure.

Figure 12:
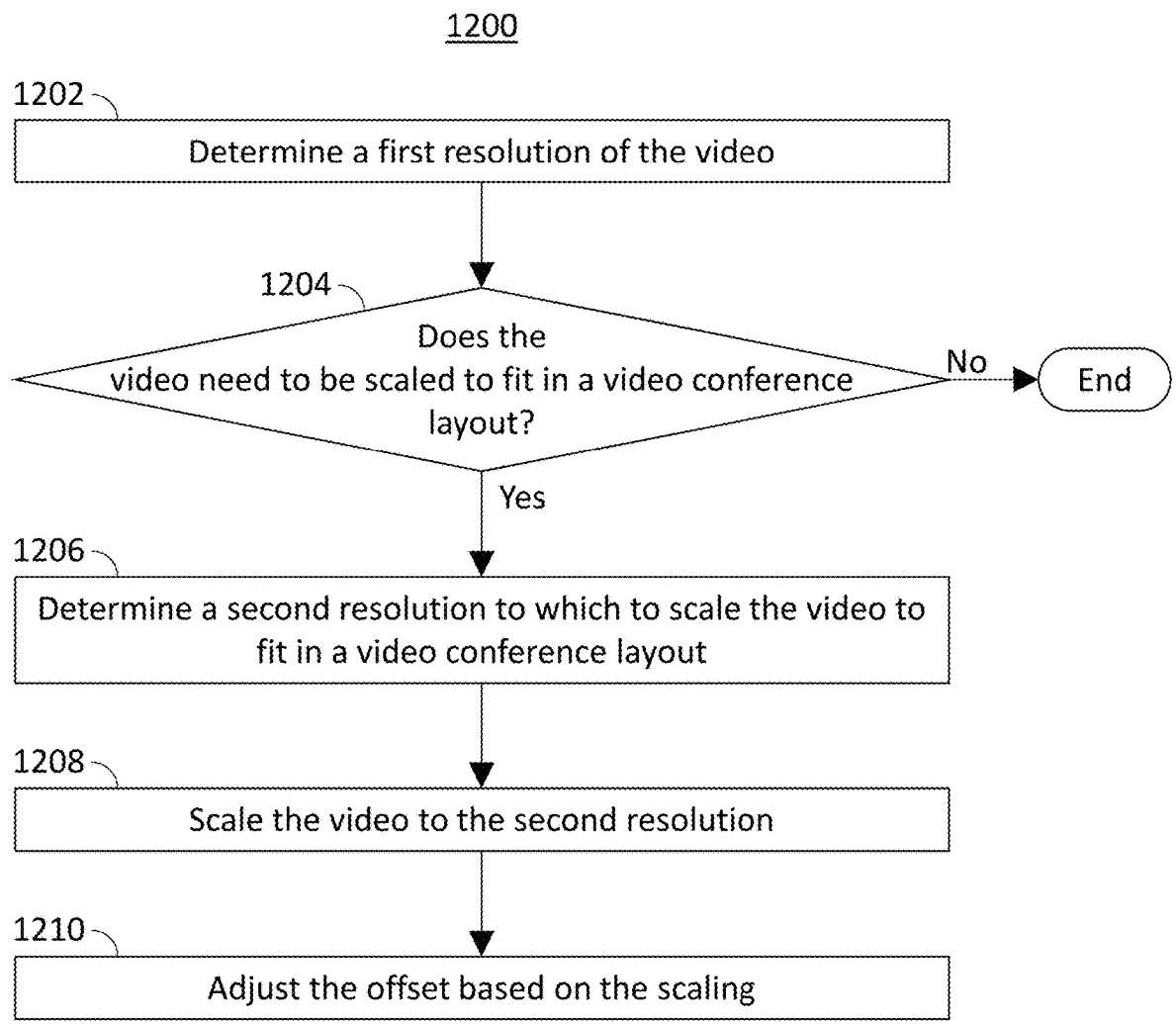
FIG. 12 is a flowchart representing an illustrative process for adjusting an offset for a scaled video, in accordance with some embodiments of the disclosure.

FIG. 12 is a flowchart representing an illustrative process 1200 for adjusting an offset for a scaled video, in accordance with some embodiments of the disclosure. Process 1200 may be implemented on control circuitry 408 or control circuitry 510. In addition, one or more actions of process 1200 may be incorporated into or combined with one or more actions of any other process or embodiment described herein.

At 1202, the control circuitry determines a first resolution of the video. The control circuitry may retrieve resolution information from metadata in the stream or may determine the highest pixel coordinate values in the video. At 1204, the control circuitry determines whether the video needs to be scaled to fit in a video conference layout. For example, the resolution of the video may be 1024×768 pixels while the space allocated for the video in the video conference layout is 640×480 pixels. The control circuitry compares the determined first resolution with the dimensions of the allocated space. If the video resolution is the same as the dimensions of the allocated space ("No" at 1204), the process ends. However, if the video resolution is not the same as the dimensions of the allocated space, then the video must be scaled to fit in the video conference layout ("Yes" at 1204).

In response to this determination, the control circuitry determines a second resolution to which to scale the video to fit in the video conferment layout. For example, the video resolution may be 1024×768 pixels and the dimensions of the area allocated for the video are 640×480 pixels. The control circuitry may compare these dimensions and determine that both the vertical and horizontal resolutions of the video can be scaled by the same factor of 0.625 (in other words, they have the same aspect ratio) to achieve a resolution of 640×480. However, the dimensions of the area allocated for the video may result in an area with a different aspect ratio than the video. In such cases, the control circuitry compares the vertical and horizontal dimensions separately, calculating two separate scaling factors.

At 1208, the control circuitry scales the video to the second resolution. If the scaling factors for both dimensions are equal, then the control circuitry scales the video by the scaling factor to arrive at the second resolution. However, if the original aspect ratio of the video is different from the aspect ratio of the space allocated for the video in the video conference layout, then control circuitry applies one of the scaling factors to both dimensions in order to preserve the original aspect ratio of the video and not cause distortions. If the original aspect ratio is wider than it is tall and the area allocated for the video is taller than it is wide, the control circuitry selects the horizontal scaling factor so that the entire width of the original video fits in the narrower area of the allocated space. This prevents the video from appearing stretched or squeezed in either dimension.

At 1210, the control circuitry adjusts the offset based on the scaling. The offset is calculated in absolute pixel coordinates. Thus, scaling the video to a smaller size results in the offset describing a larger area or higher pixel coordinate value of the scaled video than of the original video. Accordingly, the offset must be scaled along with the video. The control circuitry applies the selected scaling factor to the offset so that it describes the same relative area or position within the video.

The actions or descriptions of FIG. 12 may be used with any other embodiment of this disclosure. In addition, the actions and descriptions described in relation to FIG. 12 may be done in suitable alternative orders or in parallel to further the purposes of this disclosure.

Figure 13:
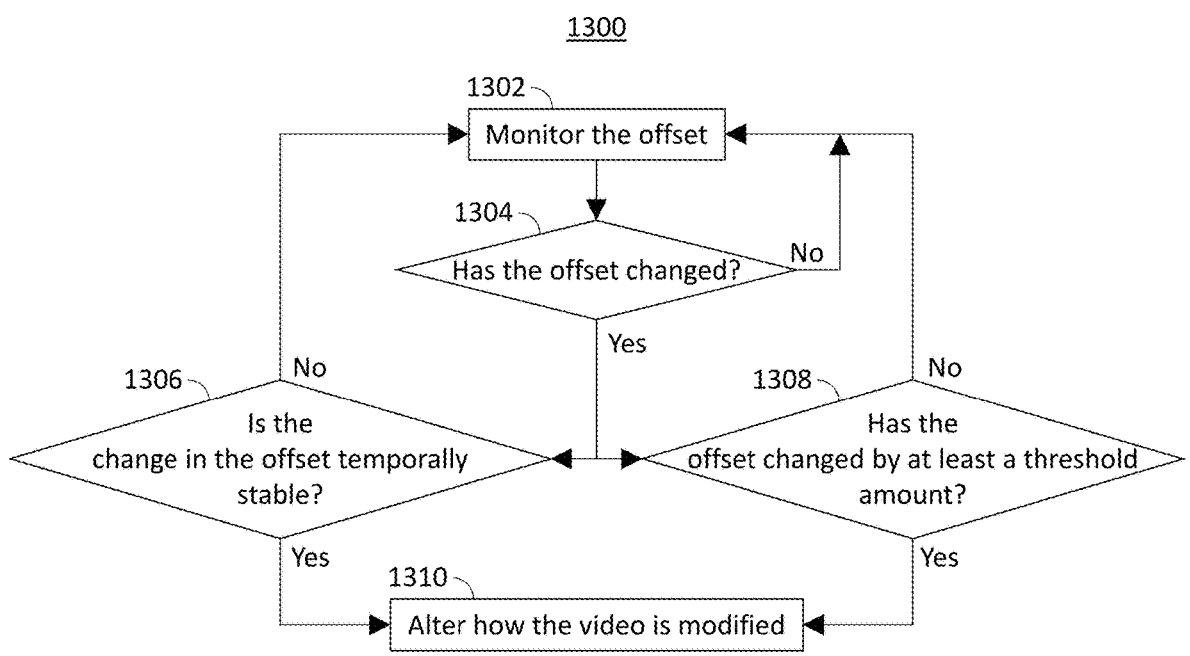
FIG. 13 is a flowchart representing an illustrative process for altering how a video is modified based on changes in an offset, in accordance with some embodiments of the disclosure.

FIG. 13 is a flowchart representing an illustrative process 1300 for altering how a video is modified based on changes in an offset, in accordance with some embodiments of the disclosure. Process 1300 may be implemented on control circuitry 408 or control circuitry 510. In addition, one or more actions of process 1300 may be incorporated into or combined with one or more actions of any other process or embodiment described herein.

At 1302, the control circuitry monitors the offset of the position of the participant. The control circuitry may store the offset in a local memory. As the video is captured, the control circuitry may periodically or continuously calculate offsets for the participant. At 1304, the control circuitry determines whether the offset has changed. Each time a new offset is calculated, the control circuitry compares the offset with the stored offset. If the offset has not changed ("No" at 1304), then processing returns to 1302, where the control circuitry continues to monitor the offset.

If the offset has changed ("Yes" at 1304), the modifications to the video may need to be altered. To determine whether alterations are needed, the control circuitry may analyze the change in the offset. At 1306, the control circuitry determines whether the change in the offset is temporally stable. The control circuitry may store each calculated offset, or a periodic sampling of offsets. If the offset has changed, but quickly changes back to the previous offset, or to within a threshold different of the original offset, the change in the offset may not be considered temporally stable. However, if the offset changes and remains within a threshold difference of the new offset, then the change may be considered temporally stable. If the change is not temporally stable ("No" at 1306), meaning that the offset changed briefly and returned to the original value, or near to the original value, then processing returns to 1302, where the control circuitry continues to monitor the offset.

At 1308, the control circuitry may determine if the offset has changed by at least a threshold amount. To be considered a change, the control circuitry may require a minimum threshold of change in the offset. Small movements of the participant that do not result in a significant change of position may not warrant altering how the video is modified. If the offset has not changed by at least the threshold amount ("No" at 1308), then processing returns to 1302 where the control circuitry continues to monitor the offset.

If the change in the offset is temporally stable ("Yes" at 1306) or meets the threshold amount of change ("Yes" at 1308), then, at 1310, the control circuitry alters how the video is modified. For example, the video can be cropped differently to account for the new position of the participant as indicated by the changed offset. Alternatively, a new translation vector can be calculated. It is noted that, in some embodiments, the control circuitry may require the change in the offset to be both temporally stable ("Yes" at 1306) and meet the threshold amount of change ("Yes" at 1308) before altering how the video is modified. For example, a large change in offset may not be temporally stable if the participant moves across the field of view of the video to retrieve an object, then returns to within a threshold amount of change from his or her original position.

The actions or descriptions of FIG. 13 may be used with any other embodiment of this disclosure. In addition, the actions and descriptions described in relation to FIG. 13 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for automatically reframing a video conference participant in a video stream, the method comprising:
    capturing video of the participant;
    generating a pixel coordinate array for each respective frame of the video;
    determining respective coordinates of a respective absolute center of each respective frame of the video;
    detecting, within a first frame of the video, a first position of the participant within the pixel coordinate array;
    calculating a participant center represented by participant center coordinates of an area of the pixel coordinate array of the first frame corresponding to the first position of the participant;
    calculating an offset for the first position of the participant, wherein the offset is based at least in part on a difference between respective coordinates of a respective absolute center of the first frame and the participant center coordinates of the first frame;
    modifying subsequent frames of the video based on the offset, wherein the subsequent frames are to be displayed after the first frame of the video; and
    presenting the modified subsequent frames of the video of the participant.

2. The method of claim 1, wherein modifying the subsequent frames of the video based on the offset further comprises translating the first position of the participant, based on the offset, to a second position corresponding to updated participant center coordinates.

3. The method of claim 2, wherein translating the first position of the participant, based on the offset, to a second position further comprises:
    calculating a translation vector; and
    for each frame of the captured video, applying the translation vector to each pixel of a plurality of pixels of the respective frame that form an image of the participant.

4. The method of claim 1, wherein modifying the subsequent frames of the video based on the offset further comprises cropping the video so that the first position of the participant is centered in the video.

5. The method of claim 1, further comprising:
    encoding a media stream including the captured video with the modified subsequent frames; and
    transmitting, to a video conference server, the media stream.

6. The method of claim 1, further comprising:
    encoding a media stream including the captured video and the offset;
    modifying the captured video to incorporate the modified subsequent frames; and
    transmitting, to a video conference server, the media stream.

7. The method of claim 6, wherein presenting the modified subsequent frames of the video of the participant further comprises:
    retrieving, at the video conference server, from the media stream, the offset;
    cropping, at the video conference server, the video based on the offset;
    reencoding, at the video conference server, the cropped video in a second media stream; and
    transmitting, from the video conference server, the second media stream to client devices associated with each participant in the video conference.

8. The method of claim 1, further comprising:
    detecting, within the video, a second position of a second participant; and
    calculating a second offset for the second position of the second participant;
    wherein modifying the video is further based on the second offset.

9. The method of claim 1, further comprising:
    determining a first resolution of the video;
    determining a second resolution to which to scale the video to fit in a video conference layout;
    scaling the video to the second resolution; and
    adjusting the offset based on the scaling.

10. The method of claim 1, further comprising:
    monitoring the offset;
    detecting a change in the offset; and
    in response to detecting a change in the offset:
        determining whether the offset has changed by at least a threshold amount; and
        in response to determining that the offset has changed by at least the threshold amount, altering how the video is modified.

11. The method of claim 1, further comprising:
    monitoring the offset;
    detecting a change in the offset; and
    in response to detecting a change in the offset:
        determining whether change in the offset is temporally stable; and in response to determining that the change in the offset is temporally stable, altering how the video is modified.

12. A system for automatically reframing a video conference participant in a video stream, the system comprising:
video capture circuitry configured to capture video of the participant;
input/output circuitry; and
control circuitry configured to:
generate a pixel coordinate array for each respective frame of the video;
determine respective coordinates of a respective absolute center of each respective frame of the video;
detect, within a first frame of the video, a first position of the participant within the pixel coordinate array;
calculate a participant center represented by participant center coordinates of an area of the pixel coordinate array of the first frame corresponding to the first position of the participant;
calculate an offset for the first position of the participant, wherein the offset is based at least in part on a difference between respective coordinates of a respective absolute center of the first frame and the participant center coordinates of the first frame;
modify subsequent frames of the video based on the offset, wherein the subsequent frames are to be displayed after the first frame of the video; and
present, using the input/output circuitry, the modified subsequent frames of the video of the participant.

13. The system of claim 12, wherein the control circuitry configured to modify the subsequent frames of the video based on the offset is further configured to translate the first position of the participant, based on the offset, to a second position corresponding to updated participant center coordinates.

14. The system of claim 13, wherein the control circuitry configured to translate the first position of the participant, based on the offset, to a second position is further configured to:
calculate a translation vector; and
for each frame of the captured video, apply the translation vector to each pixel of a plurality of pixels of the respective frame that form an image of the participant.

15. The system of claim 12, wherein the control circuitry configured to modify the subsequent frames of the video based on the offset is further configured to crop the video so that the first position of the participant is centered in the video.

16. The system of claim 12, wherein the control circuitry is further configured to:
encode a media stream including the captured video with the modified subsequent frames; and
transmit, to a video conference server, the media stream.

17. The system of claim 12, wherein the control circuitry is further configured to:
encode a media stream including the captured video and the offset;
modify the captured video to incorporate the modified subsequent frames; and
transmit, to a video conference server, the media stream.

18. The system of claim 12, wherein the control circuitry is further configured to:
detect, within the video, a second position of a second participant; and
calculate a second offset for the second position of the second participant;
wherein the control circuitry configured to modify the video is further configured to do so based on the second offset.

19. The system of claim 12, wherein the control circuitry is further configured to:
determine a first resolution of the video;
determine a second resolution to which to scale the video to fit in a video conference layout;
scale the video to the second resolution; and
adjust the offset based on the scaling.

20. The system of claim 12, wherein the control circuitry is further configured to:
monitor the offset;
detect a change in the offset; and
in response to detecting a change in the offset:
determine whether the offset has changed by at least a threshold amount; and
in response to determining that the offset has changed by at least the threshold amount, alter how the video is modified.

21. The system of claim 12, wherein the control circuitry is further configured to:
monitor the offset;
detect a change in the offset; and
in response to detecting a change in the offset:
determine whether change in the offset is temporally stable; and
in response to determining that the change in the offset is temporally stable, alter how the video is modified.

* * * * *